United States Patent
Hanada et al.

(10) Patent No.: US 6,600,143 B2
(45) Date of Patent: Jul. 29, 2003

(54) FORMED POLYPROPYLENE RESIN CONTAINER FOR MICROWAVE COOKING

(75) Inventors: Satoshi Hanada, Ibaraki (JP); Mitsunori Nodono, Tsukuba (JP); Ryuma Kuroda, Ibaraki (JP)

(73) Assignee: Sumitomo Chemical Company, Limited, Osaka (JP)

( * ) Notice: Subject to any disclaimer, the term of this patent is extended or adjusted under 35 U.S.C. 154(b) by 0 days.

(21) Appl. No.: 09/993,679

(22) Filed: Nov. 27, 2001

(65) Prior Publication Data

US 2002/0092848 A1 Jul. 18, 2002

(30) Foreign Application Priority Data

Nov. 30, 2000 (JP) ........................................ 2000-364495

(51) Int. Cl.[7] .................................................. H05B 6/80
(52) U.S. Cl. ................... 219/725; 426/243; 99/DIG. 14
(58) Field of Search ................................ 219/725, 734, 219/756, 728; 426/243; 428/34.1, 34.7; 521/92, 81; 525/191; 220/636, 902, 919, 592.15, 23.89; 99/DIG. 14

(56) References Cited

U.S. PATENT DOCUMENTS

| | | | | |
|---|---|---|---|---|
| 4,448,825 A | * | 5/1984 | Asahara ...................... 428/34.7 |
| 4,467,052 A | * | 8/1984 | Barnwell et al. .............. 521/92 |
| 4,704,510 A | * | 11/1987 | Matsui ........................ 219/728 |
| 5,569,176 A | * | 10/1996 | Graham ........................ 521/81 |
| 6,300,419 B1 | * | 10/2001 | Sehanobish et al. ......... 525/191 |
| 6,391,402 B1 | * | 5/2002 | Yokota et al. .............. 428/34.1 |

\* cited by examiner

Primary Examiner—Quang T. Van
(74) Attorney, Agent, or Firm—Sughrue Mion, PLLC

(57) ABSTRACT

An object of the present invention is to provide a foamed polypropylene resin container for microwave cooking which is free from deformation upon cooking by a microwave oven and excellent in heat resistance. The foamed polypropylene resin container for microwave cooking of the present invention, on at least one side of a foamed polypropylene resin layer, a non-foamed layer containing 100 parts by weight of a polypropylene resin and 40 to 100 parts by weight of talc.

5 Claims, No Drawings

FORMED POLYPROPYLENE RESIN CONTAINER FOR MICROWAVE COOKING

FIELD OF THE INVENTION

The present invention relates to a foamed polypropylene resin container for microwave cooking excellent in flexural rigidity under high temperature conditions.

BACKGROUND OF THE INVENTION

Foamed polypropylene resin products are excellent in heat insulating ability and light weight and have been used as construction/earthmoving materials or packaging containers. Japanese Patent Application Laid-Open No. 264938/1987 discloses a multi-layered container for microwave cooking made from a foamed polypropylene resin.

Recently, foods such as curry packed in a container preserved at room temperature become popular and they are heated as packed by a microwave oven. Thus it need to be cooked for 3 minutes or longer in the case of the use of a microwave oven having a power output of 500 Watt. It results in that the temperature of the container after the heating is immediately in some cases raised up to as high as about 120 to about 140° C. and there arises the problem that the container heated may easily be deformed.

SUMMARY OF THE INVENTION

The inventors of the present invention made intensive studies to solve the above-mentioned problem and finally have found that providing a non-foamed layer made of a polypropylene resin containing a specific amount of talc on at least one side of a foamed polypropylene resin layer prevents the resulting container from being deformed upon cooking by a microwave oven and consequently it provides an foamed polypropylene resin container for microwave cooking excellent in heat resistance.

Thus, the present invention provides a foamed polypropylene resin container for microwave cooking having a non-foamed layer containing 100 parts by weight of a polypropylene resin and 40 to 100 parts by weight of talc on at least one side of an foamed polypropylene resin layer.

DETAILED DESCRIPTION OF THE INVENTION

The foamed polypropylene resin container for microwave cooking of the present invention is characterized in that it comprises a non-foamed layer comprising a polypropylene resin and 40 to 100 parts by weight of talc per 100 parts by weight of the polypropylene resin on at least one side of an foamed polypropylene resin layer.

The present invention relates to a foamed polypropylene resin container for microwave cooking which is excellent in rigidity under high temperature conditions, e.g., when heated in a microwave oven with curry, rice, or other foods packed therein, and therefore is hardly deformed.

The foamed polypropylene resin container is light and highly heat insulating, but its flexural rigidity is deteriorated and thus the container tends to be deformed, when the food contained therein is cooked in a microwave oven and the entire container is heated to high temperatures.

Accordingly, in the present invention, at least one side of a foamed polypropylene resin layer is provided with a non-foamed layer containing 40 to 100 parts by weight of talc per 100 parts by weight of a polypropylene resin. In view of flexural rigidity upon heating at high temperatures, the amount of the talc per 100 parts by weight of the polypropylene resin is preferably not less than 40 parts by weight. From the viewpoint of moldability of the resulting container, the amount of the talc per 100 parts by weight of the polypropylene resin is preferably not more than 100 parts by weight. For higher flexural rigidity under high temperature conditions, it is more preferred that the amount of the talc is not less than 55 parts by weight, and from the viewpoint of moldability, it is more preferred that the amount of the talc is not more than 85 parts by weight.

Moreover, incorporation of talc into the foamed layer hinders the growth of foam and results in collapsing foam during the production of a foamed polypropylene resin container for microwave cooking of the present invention or a base sheet being a constituent thereof.

Moreover, when blending talc into the foamed layer, a much larger amount of talc is required to impart the same flexural rigidity as that in the case of the non-foamed layer, leading to a large increase in the weight of the resulting container. In contrast, incorporation of talc only to the non-foamed layer makes it possible to improve flexural rigidity without making the resulting foamed polypropylene resin container for microwave cooking much heavier.

From the viewpoint of flexural rigidity, the particle size of talc dispersed in the polypropylene resin forming the non-foamed layer is preferably about 0.1 to about 10 $\mu$m, more preferably about 1 to about 5 $\mu$m. A foamed polypropylene resin container for microwave cooking having an higher flexural rigidity may be obtained by setting the particle size so as to fall within the range mentioned above.

In the present invention, the particle size of the talc dispersed in the polypropylene resin forming the non-foamed layer is figured out in the following manner.

A cross-section of the non-foamed layer taken in the thick direction was examined by a scanning electron microscope (SEM) at a sufficient magnification to resolve the talc particles clearly. Regarding the talc particles observable through the microscope, the maximum length of each of at least twenty talc particles was measured and the average of the values obtained was employed as the particle size of the talc dispersed in the polypropylene resin forming the non-foamed layer. Usually, the talc particles are clearly resolved at a magnification of from 5,000 to 60,000.

In the present invention, from the viewpoint of heat insulating ability of the foamed container to be obtained, the foaming ratio of the foamed layer is preferably about two times or more, more preferably about three times or more. It is preferred that, in view of the strength of the foamed container produced, the foaming ratio is about 40 times or less, more preferably about 10 times or less. The foaming ratio of the foamed layer is adjustable by controlling the amount of a foaming agent to be added or physical conditions in the molding.

Moreover, in the present invention, the term "non-foamed layer" refers to a layer with a foaming ratio of from about 1.0 to about 1.5 times, preferably about 1.0 to about 1.1 times.

The thickness of the foamed polypropylene resin container for microwave cooking of the present invention is preferably from about 0.1 to about 3 mm. Containers having such thickness as to fall within the range mentioned above are preferable from the viewpoint of flexural rigidity and easy to produce.

For achieving sufficient heat insulating ability, the foamed layer is preferred to have a thickness of not less than about 0.3 mm. In view of heat insulation, the thicker the layer is, the more it is favorable.

Although the thickness of the non-foamed layer is not particularly restricted provided that its surface smoothness, in other words, external appearance is good, it is preferably about 1 $\mu$m or thicker, more preferably about 10 $\mu$m or thicker, with about 50 $\mu$m or thicker much more preferred. The maximum limit of the thickness of the non-foamed layer is suitably set according to the intended lightweight and moldability.

In the foamed polypropylene resin container for microwave cooking of the present invention, exemplified as the polypropylene resin forming the foamed layer are a homopolymer of propylene and a propylene copolymer containing about 50 mol % or more of the propylene unit. In the propylene copolymer, preferred examples of the component copolymerizable with propylene include ethylene and $\alpha$-olefins having 4 to 10 carbon atoms. Included in $\alpha$-olefins having 4 to 10 carbon atoms are 1-butene, 4-methylpentene-1, 1-hexene, and 1-octene. As for the content of the monomer unit other than propylene, in the case of ethylene, it is preferably about 10% by weight or less. In the case of an $\alpha$-olefin having 4 to 10 carbon atoms, it is preferably about 30% by weight or less.

Of polypropylene resins, for their capability of forming layers with a highly homogeneous cellular structure, (a) long chain branched polypropylene resins and (b) polypropylene resins having a weight average molecular weight of $1\times10^5$ or more are prefarable.

Of these polypropylene resins, a particularly preferred one is such that, when measured by for example a Meissener-type elongation rheometer (for example, Melten rheometers manufactured by Toyo Seiki Kogyo Co., Ltd. are mentioned) at an elongation strain rate of 0.1 sec$^{-1}$ and a temperature 30° C. higher than the melting point, the ratio ($\eta_{100}/\eta_1$) of its uniaxial melt elongation viscosity measured at the point where one second has passed since strain was began to be applied ($\eta_1$) to that measured at the point where 100 seconds have passed ($\eta_{100}$) is $\eta_{100}/\eta_1 \geq 10$.

In the present invention, the term "long chain branched polypropylene resin" refers to polypropylene resins having a branching degree index [A] satisfying $0.20 \leq [A] \leq 0.98$.

Included in examples of the long chain branched polyolefin resins having a branching degree index satisfying the formula $0.20 \leq [A] \leq 0.98$ is POLYPROPYLENE PF-814 manufactured by Montell.

The branching degree index is indicative of the degree of long-chain branching and is a value defined by the following expression:

$$\text{Branching degree index } [A] = [\eta]Br/[\eta]Lin$$

where $[\eta]Br$ is the intrinsic viscosity of a long-chain branched polyolefin resin, while $[\eta]Lin$ is the intrinsic viscosity of a straight-chain polyolefin having the same repeating unit as the long-chain branched polyolefin resin and a weight-average molecular weight equal to that of the long-chain branched polyolefin resin.

The "intrinsic viscosity" also called "limiting viscosity number" particularly depends upon the molecular weight and branching degree of polymer molecule. Accordingly, the intrinsic viscosity serves as a measure of the branching degree of a polymer in comparing a long-chain branched polymer with a straight-chain polymer having the same weight-average molecular weight. Thus, the ratio between the foregoing intrinsic viscosities is used as the branching degree index. The method of measuring the intrinsic viscosity of polypropylene is described in Elliot et al., [J. Appl. Polym. Sci., 14, 2947–2963 (1970)]. The intrinsic viscosity of polypropylene can be measured using a sample prepared by dissolving polypropylene in tetralin or orthodichlorobenzene at 135° C. for example. The weight-average molecular weight (Mw) of a resin can be measured by various methods, among which the method published in "American Laboratory, May, 63–75 (1978)" by M. L. McConnel, i.e., low-angle laser light scattering intensity measuring method, is particularly preferable.

In the present invention, as an example of the way of polymerizing a polypropylene resin having a weight average molecular weight of $1\times10^5$ or more, the following method can be mentioned.

That is, in the first step, under the conditions of a polymerization temperature and a polymerization pressure, liquid propylene, triethylaluminium, t-butyl-n-propyldimethoxysilane, and a preliminary activated solid catalyst component are continuously supplied, whereby the propylene is polymerized to provide a polymer with an desired intrinsic viscosity. The polymer thus obtained is continuously sent to the second step without carrying out the deactivation of the catalyst.

In the second step, under the conditions of a polymerization temperature and a polymerization pressure, with propylene and hydrogen kept supplied so that the hydrogen concentration of the gaseous phase is constant, polymerization of the propylene is continued while the catalyst-containing polymer transferred from the first step, triethylaluminium, and t-butyl-n-propyldimethoxysilane are supplied, whereby a polymer having an desired intrinsic viscosity is provided.

The weight average molecular weight is controllable by regulating the amount of the monomer being a constituent of the resin to supply.

In addition to the polypropylene resin, the foamed layer of the foamed polypropylene resin container for microwave cooking of the present invention may contain a homopolymer of an olefin having 2 or 4 to 6 carbon atoms such as ethylene, butene, pentene, orhexene, or an olefinic copolymer constituted of two or more than two kinds of monomers having 2 or from 4 to 6 carbon atoms. The copolymer may be a block, random, or graft copolymer. The foamed layer may be made of a single olefinic copolymer, and it may be composed two or more than two kinds of olefinic copolymers. From the viewpoint of improvements in moldability, incorporation of a small amount of polyethylene is preferred.

As the foaming agent for use in the formation of the foamed layer, any foaming agent selected from chemical foaming agents and physical foaming agents is available. Usable chemical foaming agents include thermal decomposition-type foaming agents which generate nitrogen gases [e.g., azodicarbonamide, azobisisobutylonitrile, dinitrosopentamethylene tetramine, p-toluenesulfonyl hydrazide, p,p'-oxy-bis(benzenesulfonyl hydrazide)] and thermal decomposition-type inorganic foaming agents which generate carbon dioxide gas (e.g., sodium bicarbonate, ammonium carbonate, ammonium bicarbonate), and usable physical foaming agents include propane, butane, water, and carbon dioxide gas. Among them, substances that are inactive with respect to a high-temperature condition or fire, such as water and carbon dioxide gas, are suitable.

In the present invention, the amount of the foaming agent is not critical and, according to its type or the type of the resin, it may suitably be controlled so as to provide the desired foaming ratio.

Exemplified as the polypropylene resin forming the non-foamed layer of the foamed polypropylene resin container for microwave cooking according to the present invention are homopolymers of propylene and block, random, or graft copolymers of propylene with at least one monomer selected from olefins having 2 or 4 to 10 carbon atoms. Of these polypropylene resins, preferably employed for preventing the surface layer from getting roughened and consequently providing foamed polypropylene resin containers for microwave cooking with good external appearance are those having a melt flow rate (temperature: 230° C., load: 2.16 kgf) (hereinafter, sometimes abbreviated to MFR) of about 5 to about 20 g/10 min., and those having a melt flow rate of about 8 to about 15 g/10 min. are particularly preferred. The melt flow rate of the polypropylene resin is measured according to JIS K7210.

The foamed polypropylene resin container for microwave cooking of the present invention may include a homopolymer of an olefin having 2 to 6 carbon atoms typified by ethylene, propylene, butene, pentene, or hexene, or a polyolefin resin such as an olefinic copolymer constituted of two or more than two kinds of monomers selected from olefins having 2 to 10 carbon atoms in its non-foamed layer. The olefin copolymer described above may be of the block, random, or graft type. The non-foamed layer may be constituted of a single kind of polyolefin resin, or it may be composed two or more than two kinds of polyolefin resins. The amount of the polyolefin resin or resins other than the polypropylene resin contained in the non-foamed layer is preferably within the range of about 1 to about 50 parts by weight per 100 parts by weight of the polypropylene resin.

The foamed polypropylene resin container for microwave cooking of the present invention may have, in addition to the above-described two essential layers, i.e., the foamed polypropylene resin layer and the non-foamed layer formed from specific amounts of a polypropylene and talc, another layer formed of a thermoplastic resin. Particularly suitable as the thermoplastic resin layer is an oriented polypropylene film (OPP), a cast polypropylene film (CPP), or a layer of an ethylene-vinyl ester copolymer saponified product.

Moreover, "modified resins" obtained by grafting, crosslinking, or modified at the molecular chain terminal are also employable.

One with a laminated structure constituted of two or more than two layers is also included in examples of those particularly preferred as the layer made from a thermoplastic resin. In the case where the thermoplastic resin layer is of the single layer type, it is preferred that its thickness is about 10 to about 100 μm. If the layer is of the multilayered type, its thickness is preferred to be about 50 to about 200 μm.

If the thermoplastic resin layer is of the laminated type constituted of two or more than two layers, an adhesive resin layer may optionally be provided. Exemplary of the resin for forming the adhesive resin layer is a polypropylene resin grafted onto an unsaturated carboxylic acid such as maleic acid or its anhydride.

Examples of the foamed polypropylene resin container for microwave cooking according to the present invention having two or more than two layers of thermoplastic resins laminated together are: an foamed polypropylene resin container for microwave cooking comprised of, in the order named from the interior of the container, a cast polypropylene layer, an adhesive resin layer, an ethylene-vinyl ester copolymer saponified product layer, an adhesive resin layer, a non-foamed layer, an foamed layer, and a non-foamed layer; and an foamed polypropylene resin container for microwave cooking composed of a cast polypropylene layer, an adhesive resin layer, an ethylene-vinyl ester copolymer saponified product layer, an adhesive resin layer, a non-foamed layer, an foamed layer, a non-foamed layer, a non-foamed layer, an foamed layer, and a non-foamed layer.

The foamed polypropylene resin container for microwave cooking of the present invention may have a heat seal layer. It is preferred that the heat seal layer is positioned so that it serves as the innermost layer. Preferred as the heat seal layer is one with which the lid of the container is heat-sealable and enabling the container to be sealed with the lid with a suitable adhesion strength (peeling strength). In other words, a layer whereby the lid is prevented from peeled off even under high temperature conditions of about about 120 to about 140° C. unless force is applied intentionally but peelable by hands. An example of such heat sealing layer is a layer made of a resin composition containing 100 parts by weight of a thermoplastic resin and about 0.5 to about 160 parts by weight of finely-divided particles having a mean particle size of from about 0.05 to about 20 μm selected from the group consisting of organic fine particles and inorganic fine particles. Employed as the thermoplastic resin for the heat seal layer is preferably a resin containing 100 parts by weight a polypropylene resin and about 10 to about 100 parts by weight of a polyethylene resin. A container having, in addition to two kinds of layers which are essential in the foamed polypropylene resin container for microwave cooking of the present invention, a layer of a thermoplastic resin can be produced by shaping a composite sheet made by laminating an foamed polyolefin resin sheet constituted of the above-described two essential layers (hereinafter, referred to as "essential foamed sheet") with the layer of a thermoplastic resin. Examples of the method for producing the composite sheet described above include an extrusion lamination method, a sandwich lamination method according to which another thermoplastic resin is melt-extruded so as to be positioned between the thermoplastic sheet or film and the essential foamed sheet for lamination, and a method in which the thermoplastic resin sheet or film is laminated with the essential foamed sheet by melting at least one side of the essential foamed sheet through heating with hot air or an infrared heater.

Particularly preferred as the way of lamination is, from the viewpoints of lightweight of the composite foamed sheet and production cost, a heat-bonding method comprising allowing the essential foamed sheet and the layer of a thermoplastic resin to pass through a nip roll system composed of two or more rolls while blowing hot air against the nip rolls using an air knife or the like, whereby at least one side of the essential foamed sheet or the layer of a thermoplastic resin is molten and they are pressed together into a lamination by the nip rolls.

The foamed polypropylene resin container for microwave cooking of the present invention may include an additive or additives if necessary. Included in additives are antioxidants, light stabilizers, ultraviolet ray absorbers, anti-clouding agents, anti-fogging agents, plasticizers, antistatic agents, lubricants, coloring agents, dioxin inhibiting agents, ethylene gas absorbing agents, deodorants, freshness-keeping agents, and antibacterial agents.

These additives can be incorporated into either the foamed layer, or the non-foamed layer, or both.

Although there is no particular restriction as to the method of producing the foamed polypropylene resin sheet for forming the foamed polypropylene resin container for microwave cooking of the present invention, preferably employed is a method comprising extruding a molten resin from a flat die (e.g., T-die, coat hanger die), a straight die, a circular die (e.g., cross-head die) and stretching the extruded resin while foaming. Moreover, also favorable as the method of forming the foamed polypropylene resin sheet is a method in which a molten resin is extruded from a die, foamed, and stretched.

The form of the foamed polypropylene resin container for microwave cooking of the present invention is not particularly restricted and it may take the form of, for example, a tray, bowl, cup, or box.

Examples of the molding method of the foamed polypropylene resin container for microwave cooking include a process comprising softening a sheet for forming the container through heating with an infrared ray heater, shaping the softened sheet according to the vacuum, pressure, or vacuum-and-pressure molding method using a male mold, a female mold, or a combination of these, and cooling the resulting product for solidification; and a process which does not utilize the vacuum, pressure, or vacuum-and-pressure molding technique, according to which a sheet for forming the foamed polypropylene resin container for microwave cooking of the present invention is supplied between two molds which fit with each other and pressed into the desired form.

In the molding method described above, before vacuum- or press-shaping the sheet with either a female mold or a male mold, or after the molding, a plug having a shape similar to that of the container may be brought into contact with the sheet thereby to shape into the desired form preliminary.

An example of the process for providing the foamed polypropylene resin container for microwave cooking of the present invention comprises the following steps.

(1) A heating step wherein the periphery of a base sheet from which the foamed polypropylene resin container for microwave cooking of the present invention is formed is held/fixed with clips and softened through heating.

(2) A molding step wherein a female mold having such a shape as to correspond to the external shape of the foamed polypropylene resin container for microwave cooking of the present invention and a plug the shape of which is in conformity with the internal shape of the container are positioned so as to be opposite to each other in relation to the base sheet; the softened base sheet is pre-shaped by bringing the plug into abutting relation with the base sheet and relatively moving in the direction of the female mold; the female mold is brought into contact with the base sheet; and the pressure between the female mold and the base sheet is reduced to establish tight contact between the surface of the female mold and the base sheet thereby to mold the sheet in the form of the foamed polypropylene resin container for microwave cooking of the present invention.

(3) A mold-releasing step wherein the article molded in the form of the foamed polypropylene resin container for microwave cooking of the present invention is detached from the mold.

The foamed polypropylene resin container for microwave cooking of the present invention can be obtained according to the molding method described above. The use of a plurality of female molds makes it possible to mold many containers at one time through a single sequence of steps.

It is preferred that the above-described process incorporates, following the heat-softening step (1), a swelling step wherein a difference in pressure is developed across the heat-softened base sheet to allow the sheet to bulge in the direction of the lower-pressure side, and that some changes in the molding method are made so that, in the molding step (2), the plug is positioned on the lower-pressure side of the base sheet and allowed to abut against the softened base sheet from the direction in which the sheet bulges. This enables the entire sheet to be stretched evenly before being shaped with the molds, preventing local unevenness in stretching, which consequently makes it possible to provide containers having a high drawn ratio as well as containers excellent in rigidity.

The drawn ratio as designated herein is a value defined by the ratio of the height of the container to the minimum dimension of the opening of the container. The larger the drawn ratio is, the thinner the sidewall of the container tends to become. In addition, the rigidity of the resulting container is liable to get deteriorated. As employed herein minimum dimension of the opening of the container refers to, if the shape of the opening of the container is circular, the inside diameter of the opening. If the shape of the opening is square, it refers to the length of a side. If the shape of the opening is rectangular, it refers to the length of a shorter side. In the case where the opening of the container is hexagonal in shape, it refers to the distance between the opposing sides.

The high temperature flexural rigidity of the foamed polypropylene resin container for microwave cooking of the present invention is evaluated by observing the degree of deformation of the container when heated in a microwave oven with something suitable packed therein.

For example, the rigidity of the container under high temperature conditions can be evaluated by: fabricating an foamed polypropylene resin container for microwave cooking having an opening diameter of 130 mm, a periphery width of 10 mm, a bottom diameter of 60 mm, and a height of 50 mm; filling the container with 230 g of curry; and observing the degree of deformation of the container when heated in a 500 Watt microwave oven for 4 minutes.

Moreover, the high temperature flexural rigidity of the foamed polypropylene resin container for microwave cooking of the present invention can also be evaluated by measuring the modulus of bending elasticity of the materials of the container at high temperatures.

For example, the high temperature flexural rigidity can be evaluated by laterally cutting a specimen which is 20 mm in width and 80 mm in length from the side wall of the foamed polypropylene resin container for microwave cooking of the present invention and measuring the modulus of bending elasticity at 120° C. using an autograph. For example, a bending elasticity of 800 kg/cm$^2$ or more shows that the container is excellent in flexural rigidity at high temperatures, and a bending elasticity of less than 800 kg/cm$^2$ indicates that the container is poor in flexural rigidity under high temperature conditions.

EXAMPLES

Hereinafter, the constitution and effects of the present invention will be described based on the following examples.

Example 1

A foamed polypropylene resin container for microwave cooking was obtained by: fabricating, according to the process which will later be described, a foamed polypropylene resin sheet constituted of two kinds of three layers, i.e., a non-foamed layer, an foamed layer, and a non-foamed layer; forming a lamination by thermally bonding a multilayer film as described below thereto; and subjecting the lamination thus obtained to vacuum molding. The multilayer film is composed of a cast polypropylene film layer, an adhesive resin layer, a saponified ethylene-vinyl ester copolymer layer, and an adhesive resin layer, the thickness of which are 70 μm, 20 μm, 30 μm, and 20 μm, respectively. Evaluation of the performance of the foamed polypropylene resin container for microwave cooking thus obtained was made and the results are shown in Table 1.

(Material of Foamed Layer)

As the material of the foamed layer, the mixture of polypropylene prepared according to the two-step polymerization method and polyethylene blended in a weight ratio of 70:30 was used. The polymerization method will be described hereinafter.

(1) Synthesis of Solid Catalyst

After having been exchanged with nitrogen, a 200-L stainless reactor equipped with a stirrer was charged with 80 L of hexane, 6.55 mol of tetrabutoxy titanium, 2.8 mol of diisobutyl phthalate, and 98.9 mol of tetraethoxysilane to prepare a homogeneous solution. Then, the solution of 51 L of butyl magnesium chloride in diisobutyl ether having a concentration of 2.1 mol/L was gradually added dropwise over 5 hours with the temperature in the reactor kept at 5° C. After the solution had been added dropwise, the mixture was stirred at room temperatures for another one hour, separated into the solid matter and the liquid matter at room temperatures, and washed with 70 L of toluene three times. Thereafter, toluene was added so that the slurry concentration was 0.6 kg/L, followed by the addition of a mixture of 8.9 mol of n-butyl ether and 274 mol of titanium tetrachloride. Further, 20.8 mol of phthalic chloride was added and the mixture was reacted at 110° C. for three hours. After the reaction, the reaction product was washed with toluene twice at 95° C. Then, after the slurry concentration had been adjusted to 0.6 Kg/L, to the reaction product were added 3.13 mol of diisobutyl phthalate, 8.9 mol of n-dibutyl ether, and 137 mol of titanium tetrachloride, and a reaction was further performed at 105° C. for 1 hour. After the reaction, the reaction product was separated into the solid phase and the liquid phase at the same temperature and washed the solid phase with 90 L of toluene twice at 95° C. Thereafter, the slurry concentration was adjusted to 0.6 kg/L, 8.9 mol of n-dibutyl ether and 137 mol of titanium tetrachloride were added thereto, followed by a reaction at 95° C. for 1 hour. After the reaction, the mixture was separated into the solid phase and the liquid phase and washed with 90 L of toluene three times at the same temperature. After the slurry concentration had been adjusted to 0.6 kg/L, 8.9 mol of n-butyl ether and 137 mol of titanium tetrachloride were added, followed by a reaction at 95° C. for 1 hour. After the reaction, the reaction product was separated into the solid phase and the liquid phase at the same temperature and washed the solid phase with 90 L of toluene three times at the same temperature. The product thus obtained was further washed with 90 L of hexane three times and dried under reduced pressure to provide 11.0 kg of a solid catalyst component.

The solid catalyst component contained 1.9% by weight of the titanium atom, 20% by weight of the magnesium atom, 8.6% by weight of a phthalic acid ester, 0.05% by weight of the ethoxy group, and 0.21% by weight of the butoxy group, and the catalyst was in the form of well-made particles containing no fine powder.

(2) Preliminary Activation of Solid Catalyst Component

A stainless autoclave equipped with a stirrer having an internal volume of 3 L was charged with 1.5 L of sufficiently dehydrated and deaerated n-hexane, 37.5 mmol of triethyl aluminium, 3.75 mmol of t-butyl-n-propyldimethoxysilane, and 15 g of the above-described solid catalyst component. While keeping the internal temperature of the reaction vessel at 5 to 15° C., 15 g of propylene was continuously supplied thereto over 30 minutes thereby to activate the solid catalyst component preliminary.

(3) Polymerization of Propylene Polymer

First Step

While feeding liquid propylene to a stainless polymerization vessel having an internal volume of 300 L at a rate of 57 kg/h with the polymerization temperature and the polymerization pressure kept at 60° C. and 27 kg/cm$^2$G, respectively, 1.3 mmol of triethyl aluminium, 0.13 mmol of t-butyl-n-propyldimethoxysilane, and 0.51 g of the preliminary activated solid catalyst component were continuously supplied per hour, and the polymerization of the propylene was carried out substantially in the absence of hydrogen to provide 2.0 kg of a polymer per hour. The amount of the polymer produced was 3,920 g per 1 g of the catalyst. Analysis of a portion of the polymer thus obtained showed that it had an intrinsic viscosity of 7.7 dl/g. The polymer obtained was continuously transferred to the second vessel without being deactivated.

Second Step

While feeding propylene and hydrogen to a fluidized bed reactor equipped with a stirrer having an internal volume of 1 m$^3$ with the polymerization temperature, the polymerization pressure, and the hydrogen concentration of the gaseous phase kept at 80° C., 18 kg/cm$^2$G, and 8 vol %, respectively, the propylene was continuously kept polymerized, during which the catalyst-containing polymer sent from the first vessel, 60 mmol of triethyl aluminium, and 6 mmol of t-butyl-n-propyldimethoxysilane were being supplied per hour. As a result, there was obtained 18.2 kg of a polymer per hour. The intrinsic viscosity of this polymer was 1.9 dl/g.

As can be seen from the results described above, the amount of the polymer formed through the two-step polymerization process was 31,760 g per 1 g of the catalyst. The weight ratio of polymerization in the first polymerization vessel to that in the second polymerization vessel was 11:89, and the intrinsic viscosity of a polymer portion formed in the second polymerization step was found to be 1.2 dl/g.

(4) Pelletization of Polymer

Per 100 parts by weight of the powdery polymer obtained through the above-described two-step reaction, 0.1 part by weight of calcium stearate, 0.05 part by weight of a phenolic antioxidant (tradename: Irganox 1010, manufactured by Ciba Specialty Chemicals), and 0.2 part by weight of a phenolic antioxidant (tradename: Sumilizer BHT, manufactured by Sumitomo Chemical Industries Co. Ltd.) were added and mixed together. Then, the mixture was melt-kneaded at 230° C. to provide pellets having a melt flow rate (MFR) of 12 g/10 minutes (230° C., 2.16 kgf).

(5) Blending of Materials of Foamed Layer

The polypropylene obtained in the manner described above and pelletized polyethylene (tradename: Sumikasen G201, manufactured by Sumitomo Chemical Industries Co., Ltd., MFR: 2 g/10 minutes (190° C., 2.16 kgf), density: 0.919 g/cm$^3$) were dry-blended together in a weight ratio of 70:30.

(Material of Non-foamed Layer)

Employed as the material for forming the foamed layer was a dried resin composition prepared by dry-blending polypropylene (Polypropylene AW161C manufactured by Sumitomo Chemical Industries Co., Ltd., MFR: 8 g/10 min., 230° C., 2.16 kgf) with talc (tradename: Micron White #5000S, manufactured by Hayashi Kasei K. K., main component: magnesium silicate, mean particle size: 2.8 μm) in a weight ratio of 60:40 and the mixture was pelletized by a one-direction biaxial extruder (tradename: Ikegai PCM45, manufactured by Ikegai Seisakusho Ltd., 45 mmø, L/D30) at 200 rpm and a die temperature of 240° C.

(Foaming Extrusion)

An apparatus composed of a 50 mmø-biaxial extruder and a 32 mmø-uniaxial extruder installed with a 90 mmø circular die was used. The hopper of the extruder was fed with a material prepared by blending one part of a nucleation agent (tradename: hydrocerol, manufactured by Boehringer Ingelheim Chemicals) per 100 parts by weight of the mixture having a 70 to 30 propylene polymer to polyethylene ratio (weight ratio) for forming the foamed layer, and one part by weight of carbon dioxide gas was injected thereto from where the material was in the process of melting and the material and carbon dioxide gas were melt-kneaded well and then fed to the die. The molten mixture with which to form the foamed layer and the molten resin composition for forming the non-foamed layer sent from the extruder were laminated together in the die and then extruded therefrom. Immediately after the extrusion, the extruded was cooled along a 210 mmø-mandrel to be stretched to 2.3 times its original dimensions. Thereafter, the cylindrical foamed sheet was slit with a cutter and developed to a flat foamed or foamed sheet and rolled up on a roll.

(Lamination of Polypropylene Resin Foamed Sheet and Thermoplastic Resin Layer)

The polypropylene resin foamed sheet obtained in the manner described above and a multilayer film constituted of three kinds of four layers were heat-bonded together to provide a lamination, the multilayer film comprising a (lamination surface side) polypropylene layer, a maleic anhydride modified polypropylene layer, a saponified ethylene-vinyl ester copolymer layer, and a maleic anhydride modified polypropylene resin layer (heat-bonded side). The thickness of the layers constituting the multilayer film are 70 $\mu$m, 20 $\mu$m, 30 $\mu$m, and 20 $\mu$m in this order named, and the following resins were employed for forming these layers.

Polypropylene: tradename: Polypropylene WFS5293, manufactured by Sumitomo Chemical Industries Co., Ltd., MFR: 2.2 g/10 min. (230° C., 2.16 kgf).

Maleic anhydride modified polypropylene: tradename: Admer QF551, manufactured by Mitsui Chemicals, MFR: 5.7 g/10 min. (230° C.).

Saponified ethylene-vinyl ester copolymer product (EVOH): tradename: Everl EP-E105, manufactured by Kuraray Co., Ltd., MFR: 5.5 g/10 min. (190° C., 2.16 kgf)

Thermal bonding of the polypropylene resin foamed sheet to the three-kinds-of-four-multilayer film was conducted in the following manner. The polypropylene resin foamed sheet and the three-kinds-of-four-multilayer film were passed between two nip rolls adjusted in temperature to 120° C. at a rate of 1 m per minute while hot air was blown against the nip roll system to a temperature of 190° C. by an air knife connected to a hot air generator thereby to provide a lamination constituted of the polyolefin resin foamed sheet and the three-kinds-of-four-multilayer film thermally bonded together.

(Molding of Foamed Polypropylene Resin Container for Microwave Cooking)

A foamed polypropylene resin container for microwave cooking was shaped by a vacuum molding apparatus. The lamination was held by clips and heated by an infrared ray heater from the upward and downward directions so that the temperature of its surface was brought up to 160° C. (heating step). The plug was moved in such a direction as to abut against the lamination. Then, the plug was moved in the direction of the female mold, i.e., in a direction perpendicular to the surface of the lamination held by the clips, so that the lamination was brought into abutting relation to the surface of the female mold. The plug abutting against the flat surface of the lamination held by the clips was then moved in the direction of the female mold thereby to shape the lamination in the form of a container preliminary. After having the lamination abut against the surface of the female mold, air was evacuated from the female mold to bring the mold and the lamination into tight contact with each other, whereby the lamination was molded in the form of a container having the same shape as that of the female mold (molding step).

Thereafter, the container thus obtained was solidified by air-cooling and detached from the female mold after having been released from the clips (mold releasing step). The edge of the lamination was trimmed to provide a foamed polypropylene resin container for microwave cooking (opening diameter: 130 mm, periphery width: 10 mm, bottom diameter: 60 mm, height: 50 mm).

The foamed polypropylene resin container for microwave cooking thus obtained was evaluated and the results are shown in Table 1.

Example 2

Except that a layer of the following resin composition was bonded to the foamed polypropylene resin sheet, a lamination was fabricated in the same manner as in Example 1. A foamed polypropylene resin container for microwave cooking was produced by subjecting this lamination to vacuum molding. The foamed polypropylene resin container for microwave cooking thus obtained was evaluated and its results are shown in Table 1.

(Lamination of Foamed Polypropylene Resin Sheet and Resin Composition Layer)

The foamed polypropylene resin sheet and a multilayer film constituted of kinds of four layers were thermally bonded together to provide a lamination, the multilayer sheet comprising (from the lamination surface side) a heat sealing layer (70 $\mu$m), a maleic anhydride modified polypropylene layer (20 $\mu$m), a saponified ethylene-vinyl ester copolymer product layer (30 $\mu$m), and a maleic anhydride modified polypropylene resin layer (20 $\mu$m) (thermally bonded surface). Employed as the resin composition for forming each of the layers constituting the multilayer film is as follows.

Resin composition for forming heat sealing layer: A resin composition prepared by melt-kneading 69 parts by weight of an ethylene/propylene copolymer (MFR: 3.5 g/10 min. (230° C., 2.16 kgf), ethylene unit content: 3.7 wt %), 30 parts by weight of a high-density polyethylene (MFR: 15 g/10 min. (190° C., 2.16 kgf), and 1 part by weight of talc (tradename: Micron White #5000S, manufactured by Hayashi Kasei, K.K., main component: magnesium silicate, mean particle size: 2.8 $\mu$m). Maleic anhydride modified polypropylene: tradename: Admer QF551, manufactured by Mitsui Chemicals, MFR: 5.7 g/10 min. (230° C., 2.16 kgf).

Saponified ethylene-vinyl ester copolymer product (EVOH): tradename: Everl EP-E105, manufactured by Kuraray Co., Ltd., MFR: 5.5 g/10 min. (190° C., 2.16 kgf).

Comparative Example 1

Except that the following resin was employed as the material of the non-foamed layer, a foamed polypropylene resin sheet and its laminated product were fabricated in the same manner as that in Example 1. By subjecting this lamination to vacuum molding, a foamed polypropylene resin container for microwave cooking was obtained. The foamed polypropylene resin container for microwave cooking thus obtained was evaluated and the results are shown in Table 1.

(Material of Non-foamed Layer)

As the material of the non-foamed layer, polypropylene (polypropylene manufactured by Sumitomo Chemical Co., Ltd., tradename: AW161C, MFR: 8 g/10 min. (230° C., 2.16 kgf)).

(Melt Flow Rate (MFR) of Resin)

The melt flow rate (MFR) of the resin was measured in accordance with JIS K7210.

That is, the melt flow rate was measured by a commercially available melt indexer (a melt indexer manufactured by Takara Kogyo K.K., Model: L207) using a cylinder 160 mm in length and 9.55 mm in diameter, a die 8 mm in length, 9.5 mm in external diameter, and 2.1 mm in internal diameter, and a piston with a head 6.35 mm in length and 9.47 mm in diameter.

The cylinder was fed with the resin to be measured in a adequate amount in view of its kind or MRF. Then, the piston was inserted into the cylinder and, with a weight of 2.16 kgf placed thereon, the resin was pre-heated at a suitable temperature, in other words, at 230° C. in the case of polypropylene and 190° C. in the case of polyethylene.

After it had been recognized that, at the point of time at which 6 minutes had passed since the initiation of heating, the resin was completely melted and extruded with no bubble contained therein, the product extruded from the outlet of the die was removed. Then, the weight of the resin extruded after that and the time taken to extrude the resin were measured, and the amount of the resin extruded per 10 minutes was figured out. If the resin to be employed is one that has a melt flow rate of from 3.5 to 10 g/10 min., it is preferred to fill the cylinder with 5 to 8 g of the resin and measure the amount of the resin to be extruded within about 30 seconds. This procedure was repeated at least three times and the average of the measured values was employed as the melt flow rate.

TABLE 1

| Item | Example 1 | Example 2 | Comparative example 1 |
|---|---|---|---|
| Thickness of side wall of container (mm) | 1.1 | 1.1 | 1.1 |
| Thickness of non-foamed layer (mm) | 0.04 | 0.04 | 0.04 |
| MFR (g/10 min.) of polypropylene contained in non-foamed layer | 8 | 8 | 8 |
| Talc content of non-foamed layer (parts by weight) (per 100 parts by weight of polypropylene contained in non-foamed layer) | 67 | 67 | 0 |
| Foaming ratio (times) of non-foamed surface layer | 1.0 | 1.0 | 1.0 |
| Foaming ratio of foamed layer (times) | 4.5 | 4.5 | 4.5 |
| High temperature rigidity of container | ◯ | ◯ | Δ |
| Modulus of bending elasticity of container material under high temperature conditions (kg/cm$^2$) | 1080 | 1120 | 630 |

(High Temperature Rigidity of Container)

The container was filled with 230 g of cooked curry and heated in a 500 Watt microwave oven for 4 minutes. The high temperature rigidity of the container was evaluated based on the degree of deformation.

Symbols in Table 1

◯: substantially not deformed

Δ: slightly deformed, such as wrinkles on the flange or side wall of the container (Modulus of Bending Elasticity of Container Material under High Temperature Conditions)

A specimen, 20 mm in width and 80 mm length, was laterally cut from the sidewall of the container, and the modulus of bending elasticity at 120° C. was measured using an autograph (manufactured by Shimadzu Corp., Model: AGS-500D).

Measurement of modulus of bending elasticity: a rectangular specimen was held horizontally at two points. With a load placed on the center of the points of support, the relation between the load and the deflection was studied. From the slope of the straight part of the minimum load-side deflection curve, the bending elasticity (kg/cm$^2$) was figured out utilizing the following formula (1).

$$E = \frac{l^3}{4*b*h^3} * \frac{p}{y} \qquad (1)$$

E: bending elasticity (kg/cm$^2$), l: span distance (50 mm), b: width of specimen (20 mm), h: thickness of specimen, p/y: slope of straight part of minimum load-side deflection curve (kg/cm) loading rate: 10 mm/minute.

A bending elasticity of 800 kg/cm or more indicates that the container is excellent in flexural rigidity at high temperatures, and a bending elasticity of less than 800 kg/cm$^2$ shows that the container is poor in flexural rigidity under high temperature conditions.

What is claimed is:

1. A foamed polypropylene resin container for microwave cooking comprises a non-foamed layer and a foamed polypropylene resin layer, the non-foamed layer comprising 100 parts by weight of the polypropylene resin and 40 to 100 parts by weight of talc and being on at least one side of a foamed polypropylene resin layer.

2. The foamed polypropylene resin container for microwave cooking according to claim 1, wherein the melt flow rate of the polypropylene resin is 5 to 20 g/10 minutes.

3. The foamed polypropylene resin container for microwave cooking according to claim 1, wherein the particle size of the talc is 0.1 to 10 μm.

4. The foamed polypropylene resin container for microwave cooking according to claim 1, wherein the amount of the talc is 55 to 85 parts by weight.

5. A process for producing a foamed polypropylene resin container for microwave cooking, which comprises laminating at least one side of a foamed polypropylene resin layer with a non-foamed layer comprising 100 parts by weight of a polypropylene resin and 40 to 100 parts by weight of talc, heating, and shaping.

* * * * *